United States Patent
Cojocaru et al.

(10) Patent No.: US 10,333,146 B2
(45) Date of Patent: Jun. 25, 2019

(54) ELECTRODE-FORMING COMPOSITION

(75) Inventors: Paula Cojocaru, Legnano (IT); Riccardo Pieri, Milan (IT); Marco Apostolo, Senago (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 704 days.

(21) Appl. No.: 14/344,486

(22) PCT Filed: Sep. 6, 2012

(86) PCT No.: PCT/EP2012/067408
§ 371 (c)(1),
(2), (4) Date: Mar. 12, 2014

(87) PCT Pub. No.: WO2013/037692
PCT Pub. Date: Mar. 21, 2013

(65) Prior Publication Data
US 2014/0342224 A1    Nov. 20, 2014

(30) Foreign Application Priority Data
Sep. 13, 2011 (EP) .................... 11181048

(51) Int. Cl.
*H01M 4/62* (2006.01)
*H01M 4/04* (2006.01)
(Continued)

(52) U.S. Cl.
CPC .......... *H01M 4/623* (2013.01); *H01G 9/0029* (2013.01); *H01G 11/22* (2013.01);
(Continued)

(58) Field of Classification Search
CPC .. H01M 4/623; H01M 4/0419; H01M 4/0409; H01M 4/0414; H01M 4/62;
(Continued)

(56) References Cited

U.S. PATENT DOCUMENTS

| | | | |
|---|---|---|---|
| 6,203,944 B1 | 3/2001 | Turner et al. | |
| 6,348,284 B1 | 2/2002 | Bernard et al. | |

(Continued)

FOREIGN PATENT DOCUMENTS

| | | | |
|---|---|---|---|
| CN | 1649188 | * | 8/2005 |
| CN | 1649188 A | | 8/2005 |

(Continued)

OTHER PUBLICATIONS

Teng, H. Appl. Sci. 2012 (2) 496-512.*
(Continued)

*Primary Examiner* — Lisa S Park
(74) *Attorney, Agent, or Firm* — Osha Liang LLP

(57) ABSTRACT

The invention pertains to an aqueous electrode-forming composition comprising:—at least one fluoropolymer [polymer (F)];—particles of at least one powdery active electrode material [particles (P)], said particles (P) comprising a core of an active electrode compound [compound (E)] and an outer layer of a metallic compound [compound (M)] different from Lithium, said outer layer at least partially surrounding said core; and—water, to a process for its manufacture, to a process for manufacturing an electrode structure using the same, to an electrode structure made from the same and to an electrochemical device comprising said electrode structure.

18 Claims, 2 Drawing Sheets

(51) Int. Cl.
- H01G 11/22 (2013.01)
- H01G 11/58 (2013.01)
- H01G 9/00 (2006.01)
- H01M 4/36 (2006.01)
- H01M 4/38 (2006.01)
- H01M 4/485 (2010.01)

(52) U.S. Cl.
CPC .......... *H01G 11/58* (2013.01); *H01M 4/0409* (2013.01); *H01M 4/0414* (2013.01); *H01M 4/0419* (2013.01); *H01M 4/36* (2013.01); *H01M 4/366* (2013.01); *H01M 4/38* (2013.01); *H01M 4/485* (2013.01); *H01M 4/62* (2013.01); *H01M 4/621* (2013.01); *Y10T 29/417* (2015.01); *Y10T 29/49115* (2015.01)

(58) Field of Classification Search
CPC ........ H01M 4/485; H01M 4/38; H01M 4/366; H01M 4/36; H01M 4/621; H01G 11/58; H01G 11/22; H01G 9/0029; Y10T 29/49115; Y10T 29/417
See application file for complete search history.

(56) References Cited

U.S. PATENT DOCUMENTS

| | | | |
|---|---|---|---|
| 2002/0034686 A1* | 3/2002 | Yamakawa | H01M 4/621 429/217 |
| 2002/0076486 A1 | 6/2002 | Kweon et al. | |
| 2002/0110736 A1 | 8/2002 | Kweon et al. | |
| 2003/0039887 A1 | 2/2003 | Yun et al. | |
| 2003/0073004 A1 | 4/2003 | Kweon et al. | |
| 2004/0029005 A1 | 2/2004 | Leising et al. | |
| 2005/0271940 A1 | 12/2005 | Fukunaga et al. | |
| 2006/0099505 A1 | 5/2006 | Fujino et al. | |
| 2009/0191455 A1* | 7/2009 | Gao | H01M 10/0525 429/149 |
| 2010/0133482 A1* | 6/2010 | Abusleme | B01D 69/02 252/511 |
| 2010/0304270 A1 | 12/2010 | Amin-Sanayei et al. | |
| 2011/0311867 A1 | 12/2011 | Wakizaka et al. | |

FOREIGN PATENT DOCUMENTS

| | | |
|---|---|---|
| CN | 101083318 A | 12/2007 |
| EP | 1329973 A1 | 7/2003 |
| JP | 08138670 A | 5/1996 |
| JP | 08222219 A | 8/1996 |
| JP | 08279357 A | 10/1996 |
| JP | 09147836 A | 6/1997 |
| JP | 11016566 A | 1/1999 |
| JP | 2001035539 A | 2/2001 |
| JP | 2001202957 A | 7/2001 |
| JP | 2004-146253 A | 5/2004 |
| JP | 2006024550 A | 1/2006 |
| JP | 2010-170993 A | 8/2010 |
| JP | 2010251047 A | 11/2010 |
| WO | 0003444 A1 | 1/2000 |
| WO | 2010/098452 A1 | 9/2010 |

OTHER PUBLICATIONS

MSDS for LiFePO4 (Year: 2015).*
Song, G.-M. et al., "Enhanced electrochemical properties of LiFePO4 cathode for Li-ion batteries with amorphous NiP coating", Journal of Power Sources (2010), 195(12), 3913-3917.
Alger Mark S.M., "Polymer Science Dictionary", 1989, London School of Polymer Technology, Polytechnic of North London, UK published by Elsevier Applied Science, p. 476.
Caballero A. et al., "A New and Fast Synthesis of Nanosized LiFePO4 Electrode Materials", European Journal of Inorganic Chemistry, May 2006, vol. 2006, Issue 9, pp. 1758-1764.
Office Action dated Aug. 9, 2018, issued by the Korean Intellectual Property Office (KIPO) in corresponding Korean Patent Application No. KR 10-2014-7009354, with USPTO Global Dossier English translation (13 pages).
Hao, Qin, et al., "Nano-CuO coated LiCoO2: Synthesis, improved cycling stability and good performance at high rates"; Electrochimica Acta 56 (2011); pp. 9027-9031.

* cited by examiner

ELECTRODE-FORMING COMPOSITION

CROSS-REFERENCE TO RELATED APPLICATION

This application is a U.S. national stage entry under 35 U.S.C. § 371 of International Application No PCT/EP2012/067408 filed Sep. 6, 2012, which claims priority to EP application No. 11181048.7 filed Sep. 13, 2011. The entire contents of these applications are explicitly incorporated herein by this reference.

TECHNICAL FIELD

The invention pertains to electrode-forming composition, to a process for their manufacture, to the use thereof for manufacturing electrodes and to electrodes derived therefrom.

BACKGROUND ART

Vinylidene fluoride (VDF) polymers are known in the art to be suitable as binders for the manufacture of electrodes for use in non-aqueous-type electrochemical devices such as batteries, preferably secondary batteries, and electric double layer capacitors.

Generally, techniques for manufacturing electrodes involve the use of organic solvents such as N-methyl-2-pyrrolidone (NMP) for dissolving VDF polymer binders and homogenizing them with a powdery electrode material and all other suitable components to produce a paste to be applied to a metal collector.

The role of the organic solvent is typically to dissolve the VDF polymer in order to bind the powdery electrode material particles to each together and to the metal collector upon evaporation of the organic solvent.

Nevertheless, more recently, approaches are pursued wherein use of organic solvents is commonly avoided so as to ensure more environmentally friendly techniques, and waterborne solutions have been proposed.

For instance, US 2006/0099505 (SONY CORPORATION) 11 May 2006 discloses a process for manufacturing an anode for a battery comprising using an anode mixture slurry prepared by dispersing a particulate anode active material and a particulate binder containing at least one of the group consisting of homopolymers and copolymers of vinylidene fluoride (VDF) in a dispersion medium having a swelling degree of 10% or less to the binder. The dispersion medium is preferably water.

Similarly, US 2010/0304270 (ARKEMA INC.) 2 Dec. 2010 notably discloses water-borne electrode-forming compositions comprising, inter alia, vinylidene fluoride polymer particles and powdery electrode materials, including notably:

- carbonaceous materials, nano-titanate or other matrix capable of being doped with lithium ions, in the case of negative electrode; and
- oxides, sulfides or hydroxides of lithium and/or a transition metal (including Co, Mn, Al, Ti, Ni, Fe . . . ), in the case of positive electrode.

Nevertheless, cathode materials are generally sensitive to moisture/humidity e.g. because of solubility in water of the same, and/or possibly hydrolysis phenomena, up to complete decomposition of the material, negatively affecting final electrode performances. Thus, the water-borne route for manufacturing electrodes may lead to poorer final battery performances or can even be an absolutely non practicable solution, when solubility and/or decomposition is at issue, because of the unavoidable presence of moisture introduced during manufacture of the electrode itself, which might aggress the active material at the high temperatures of typical operations.

There is thus still a current shortfall in the art for aqueous electrode-forming composition providing excellent performances in secondary batteries, with no negative impact due to the humidity/moisture on the active electrode material.

On the other side, techniques involving the coating or plating of positive (cathode) electrode materials for improving their performances in Li batteries, including embodiments wherein the same are used for formulating cathodes including PVDF binder, are known. Rationale for including said additional coating layer is often modifying electrical conductivity, minimize oxygen loss at high temperature (and hence minimizing explosion failures of battery), limiting dissolution of the material by interaction with the electrolytic solutions, etc. Examples of such disclosures are briefly summarized herein below.

Document JP 8138670 (TOSHIBA CORP) 31 May 1996 discloses particles of $LiNiO_2$ having on their surface a layer comprising an additional element whose concentration is higher then in the core, said element being selected from a alkaline metal other than Li, a alkaline-earth metal, a transition metal other than Ni, a group III element, a group IV element, a group V element or a chalcogen. This layer is taught as increasing the stability of the crystal structure of the $LiNiO_2$ core, so that cyclability of the corresponding Li battery is enhanced. Core-shell particles as above described are obtained from thermal sintering of hydroxides or other precursors mixtures: because of the formation of the crystalline latice of $LiNiO_2$, the additional component is preferably expulsed to the surface, under the form of oxide. Exemplified embodiments make use of B, Al, Si, P, Mn, Co, Fe, Zn, Ga. As binding agent is mention made, inter alia, of PVDF, PTFE, EPDM.

Document JP 11016566 (HITACHI LTD) 22 Jan. 1999 discloses a cathode material (or a cathode assembly) covered with a metal or a metal compound having excellent oxygen uptake capability. The problem solved is controlling the ignition and explosion of a cell, by surrounding the cathode active material, which might generate oxygen under overcharging or overheating conditions, with a metal (or metal oxide compound) able to react and capture said oxygen. The metal is selected from Ti, Al, Sn, Bi, Cu, Si, Ga, W, Zr, B, Mo. Electrodes are manufactured using PVDF as binding agent.

Document US 2002076486 (SAMSUNG SDI CO., LTD) 20 Jun. 2002 discloses a method for coating a positive electrode material including mixing and drying simultaneously a composition of cathode material and coating precursor in a liquid medium. Said liquid medium can be water or an organic solvent e.g. an alcohol. The coating element is any of Mg, Al, Co, K, Na, Ca, Si, Ti, V, Sn, Ge, Ga, B, As, Zr, preferably Al or B. The coated materials were used for fabricating electrodes from a paste comprising PVDF in NMP.

Document CN 101083318 (BYD CO LTD) 5 Dec. 2007 discloses the use of certain plating compositions comprising a particular reducing agent for coating certain compound onto the surface of positive electrode materials, in particular $LiFePO_4$ and $LiCoO_2$. The metal used for coating can be any of Al, Mg, Ti, Cu, Ag, Ba, Ca, Mn, Fe, Co, Ni. The coated materials were notably used for fabricating electrodes from a paste comprising PVDF in NMP.

SONG, GUI-MING, et al. Enhanced electrochemical properties of LiFePO4 cathode for Li-ion batteries with amorphous NiP coating. *Journal of Power Sources.* 2010, vol. 195, no. 12, p. 3913-3917. discloses coating of LiFePO$_4$ with a Ni/P alloy from an aqueous plating bath. Electrodes therefrom were manufactured using PVDF as a binder.

SUMMARY OF INVENTION

Figure 1:
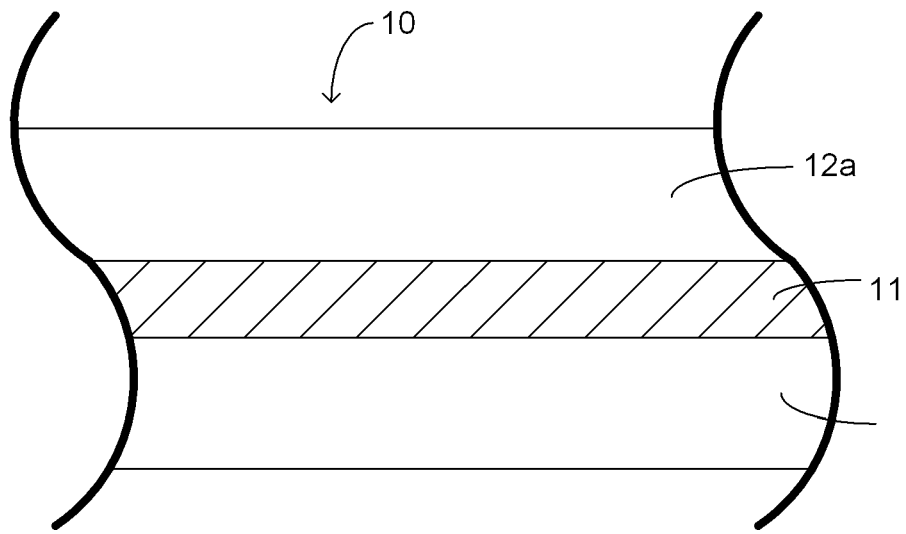
FIG. 1 depicts an electrode structure obtained by applying the electrode-forming composition on the invention onto both surfaces of an electroconductive substrate.

The Applicant has now found that it is possible to ensure excellent performances in secondary batteries comprising electrodes made from water-borne electrode-forming compositions when using core-shell active electrode materials comprising an outer layer of a metal compound.

It is thus an object of the invention an aqueous electrode-forming composition comprising:
  at least one fluoropolymer [polymer (F)];
  particles of at least one powdery active electrode material [particles (P)], said particles (P) comprising a core of an active electrode compound [compound (E)] and an outer layer of a metallic compound [compound (M)] different from Lithium, said outer layer at least partially surrounding said core; and
  water.

The Applicant has surprisingly found that when the aqueous composition comprise said particles (P), as above detailed, effective manufacturing of electrode structure is enabled from a water-borne and environmental friendly process without impairment of the performances of the active electrode compound, thus enabling a capacity retention strongly improved over electrodes made from uncoated powders, and substantially similar, even better, over results obtained from traditional solvent-borne electrode-forming compositions.

To the purpose of the present invention, the expression "fluoropolymer" is intended to denote any polymer comprising more than 15% moles of recurring units derived from at least one ethylenically unsaturated monomer comprising at least one fluorine atom (hereinafter, fluorinated monomer).

The fluoropolymer comprises preferably more than 20% moles, more preferably more than 30% moles of recurring units derived from the fluorinated monomer.

The fluorinated monomer can further comprise one or more other halogen atoms, in particular chlorine. Shall the fluorinated monomer be free of hydrogen atoms, it is designated as per(halo)fluoromonomer. Shall the fluorinated monomer comprise at least one hydrogen atom, it is designated as hydrogen-containing fluorinated monomer.

The polymer (F) can be a homopolymer of a fluorinated monomer or can be a copolymer comprising recurring units derived from one or more than one fluorinated monomers, and optionally from one or more than one hydrogenated (i.e. free of fluorine atom) monomers.

Non limitative examples of suitable fluorinated monomers are notably:
  $C_2$-$C_8$ fluoro- and/or perfluoroolefins, such as tetrafluoroethylene (TFE), vinyl fluoride, vinylidene fluoride (VDF), trifluoroethylene (TrFE), hexafluoropropene (HFP), pentafluoropropylene, and hexafluoroisobutylene;
  perfluoroalkylethylenes complying with formula $CH_2=CH-R_{f0}$, in which $R_{f0}$ is a $C_1$-$C_6$ perfluoroalkyl;
  chloro- and/or bromo- and/or iodo-$C_2$-$C_6$ fluoroolefins, including chlorotrifluoroethylene (CTFE);
  fluoroalkylvinylethers complying with formula $CF_2=CFOR_{f1}$ in which $R_{f1}$ is a $C_1$-$C_6$ fluoro- or perfluoroalkyl, e.g. $-CF_3$, $-C_2F_5$, $-C_3F_7$;
  fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
  fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;
  fluorodioxoles, of formula:

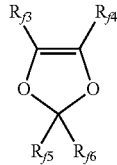

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

Non limitative examples of suitable hydrogenated monomers are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Within the context of the present invention the mention "at least one fluoropolymer [polymer (F)]" is intended to denote one or more than one polymer (F). Mixtures of polymers (F) can be advantageously used for the purposes of the invention.

The polymer (F) of the invention is preferably thermoplastic. The term "thermoplastic" is understood to mean, for the purposes of the present invention, polymers existing, at room temperature, below their glass transition temperature, if they are amorphous, or below their melting point if they are semi-crystalline, and which are linear (i.e. not reticulated). These polymers have the property of becoming soft when they are heated and of becoming rigid again when they are cooled, without there being an appreciable chemical change. Such a definition may be found, for example, in the encyclopaedia called "Polymer Science Dictionary", Mark S. M. Alger, London School of Polymer Technology, Polytechnic of North London, UK, published by Elsevier Applied Science, 1989.

Thermoplastic polymers are thus distinguishable from elastomers. To the purpose of the invention, the term "elastomer" is intended to designate a true elastomer or a polymer resin serving as a base constituent for obtaining a true elastomer. True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time. Polymer resins serving as a base constituent for obtaining true elastomers are in general amorphous products having a glass transition temperature ($T_g$) below room temperature. In most cases, these products correspond to copolymers having a $T_g$ below 0° C. and including reactive functional groups (optionally in the presence of additives) allowing the true elastomer to be formed.

Preferably, the thermoplastic fluoropolymer [polymer (F)] of the invention is semi-crystalline.

The term "semi-crystalline" is intended to denote a polymer having a heat of fusion of more than 1 J/g when measured by Differential Scanning Calorimetry (DSC) at a heating rate of 10° C./min, according to ASTM D 3418.

Preferably, the polymer (F) of the invention has a heat of fusion of at least 10 J/g, more preferably of at least 30 J/g.

Generally, the polymer (F) is a hydrogen-containing fluoropolymer.

By "hydrogen-containing fluoropolymer" it is meant a fluoropolymer as above defined comprising recurring units derived from at least one hydrogen-containing monomer. Said hydrogen-containing monomer may be a fluorinated (i.e. comprising at least one fluorine atom) monomer or may be a hydrogenated (i.e. free of fluorine atom) monomer.

Thus, this definition encompasses notably copolymers of one or more per(halo)fluoromonomer (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated monomers.

Preferably, the polymer (F) is a vinylidene fluoride (VDF) polymer, i.e. a polymer comprising recurring units derived from vinylidene fluoride.

The VDF polymer [polymer (VDF)] is generally a semi-crystalline VDF polymer which can advantageously processed in the melt and which possesses typically a heat of fusion of more than 5 J/g, preferably more than 7 J/g, even more preferably 10 J/g, when measured according to ASTM D 3418.

The polymer (VDF) is preferably a polymer comprising:

(a') at least 50% by moles, preferably at least 70%, more preferably at least 80% by moles of recurring units derived from vinylidene fluoride (VDF);

(b') optionally from 0.1 to 20%, preferably from 0.1 to 15%, more preferably from 0.1 to 10% by moles of a fluorinated monomer different from VDF; said fluorinated monomer being preferably selected in the group consisting of vinylfluoride (VF$_1$), chlorotrifluoroethylene (CTFE), hexafluoropropene (HFP), tetrafluoroethylene (TFE), perfluoromethylvinylether (MVE), trifluoroethylene (TrFE) and mixtures therefrom; and (c') optionally from 0.1 to 10%, by moles, preferably 0.1 to 5% by moles, more preferably 0.1 to 3% by moles, based on the total amount of monomers (a') and (b'), of one or more hydrogenated monomer(s).

According to certain preferred embodiments, the polymer (F) is a VDF polymer comprising recurring units derived from vinylidene fluoride (VDF) and from at least one (meth)acrylic monomer (MA) having formula (I) here below:

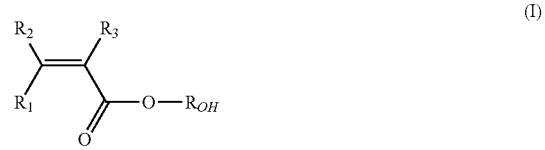

(I)

wherein:

$R_1$, $R_2$ and $R_3$, equal to or different from each other, are independently selected from a hydrogen atom and a $C_1$-$C_3$ hydrocarbon group, and $R_{OH}$ is a hydrogen atom or a $C_1$-$C_5$ hydrocarbon moiety comprising at least one hydroxyl group.

The polymer (VDF) according to this embodiment comprises typically at least 50% by moles, preferably at least 70%, more preferably at least 80% by moles of recurring units derived from vinylidene fluoride (VDF).

The polymer (F) comprises typically at least 0.01% by moles, preferably at least 0.02% by moles, more preferably at least 0.03% by moles of recurring units derived from at least one (meth)acrylic monomer (MA) having formula (I) as described above.

The polymer (F) comprises typically at most 10% by moles, preferably at most 5% by moles, more preferably at most 2% by moles of recurring units derived from at least one (meth)acrylic monomer (MA) having formula (I) as described above.

The (meth)acrylic monomer (MA) of the polymer (VDF) preferably complies with formula (II) here below:

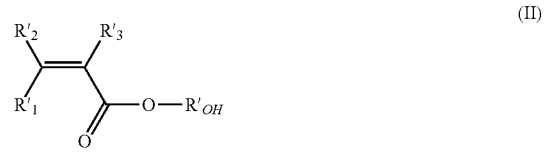

(II)

wherein:

$R'_1$, $R'_2$ and $R'_3$ are hydrogen atoms, and $R'_{OH}$ is a hydrogen atom or a $C_1$-$C_5$ hydrocarbon moiety comprising at least one hydroxyl group.

Non-limitative examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylate.

The (meth)acrylic monomer (MA) is more preferably selected from the followings:

hydroxyethyl acrylate (HEA) of formula:

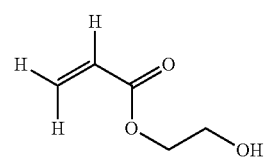

2-hydroxypropyl acrylate (HPA) of either of formulae:

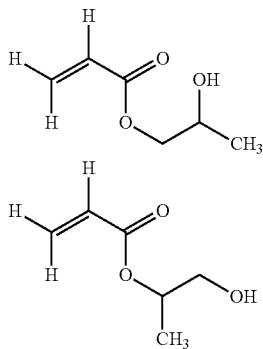

acrylic acid (AA) of formula:

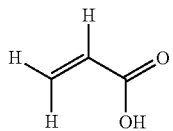

and mixtures thereof.

Good results have been obtained when the (meth)acrylic monomer (MA) of the polymer (VDF) is acrylic acid (AA) or hydroxyethyl acrylate (HEA).

The polymer (VDF) may further comprise recurring units derived from at least one other fluorinated monomer different from VDF; said fluorinated monomer being preferably selected in the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom.

Should polymer (VDF) comprise recurring units derived from at least one other fluorinated monomer different from VDF, the polymer (VDF) typically comprises 0.1 to 20%, preferably from 0.1 to 15%, more preferably from 0.1 to 10% by moles of recurring units derived from said monomer(s).

The polymer (F) used in the invention is generally prepared by polymerizing means known in the art, using aqueous free-radical emulsion polymerization, although suspension, solution and supercritical $CO_2$ polymerization processes may notably also be used.

Typically, in said aqueous free-radical emulsion polymerization, a reactor is generally charged with deionized water, water-soluble surfactant capable of emulsifying the reactant mass during polymerization and optional paraffin wax antifoulant. The mixture is generally stirred and deoxygenated. A predetermined amount of chain transfer agent (CTA) can be advantageously introduced into the reactor, the reactor temperature is generally raised to the desired level and vinylidene fluoride (and possibly one or more additional monomers) is usually fed into the reactor. Typically, once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to select the same. Typically the temperature will be from about 30° to 150° C., preferably from about 60° to 110° C. Generally, once the desired amount of polymer has been reached in the reactor, the monomer feed is stopped, but initiator feed is optionally continued to consume residual monomer. Residual gases (containing unreacted monomers) are typically vented and the latex recovered from the reactor.

The surfactant used in the polymerization can be any surfactant known in the art to be useful in fluorinated monomer emulsion polymerization, including perfluorinated, partially fluorinated, and non-fluorinated surfactants. Nevertheless, the polymerization can be also carried out in the absence of surfactant or in presence of an in situ generated oligomer having stabilizing properties.

The polymerization generally results in a latex of polymer (F) generally having a solids level of 10 to 60 percent by weight, preferably 10 to 50 percent, and having a average particle size of less than 500 nm, preferably less than 400 nm, and more preferably less than 300 nm. The average particle size is generally at least 20 nm and preferably at least 50 nm.

The latex of polymer (F) can be used as such for manufacturing the electrode-forming composition of the invention or the polymer (F) can be coagulated, separated from the aqueous polymerization medium and provided under the form of particles for being incorporated in the electrode forming composition of the invention.

The composition of the invention generally comprises the polymer (F) in an amount of 0.5 to 10% wt, preferably from 1 to 8% wt, with respect to the total weight of the composition.

The electrode forming composition of the invention can comprise at least one surfactant. The surfactant is generally intended to improve shelf-stability and provide additional stabilization of the polymer (F), including during preparation of the electrode-forming composition. Said surfactant can be provided into the composition of the invention, as a whole or in part, in combination with the polymer (F), as a result of the emulsion polymerization process, and/or can be add, as a whole or in part, after polymerization.

The surfactant can be selected notably from fluorinated surfactant [surfactant (FS)] and hydrogenated surfactants free from fluorine atoms [surfactant (H)].

Surfactants (FS), if used, are generally provided in combination with the polymer (F), generally under the form of a aqueous latex of polymer (F) comprising said surfactant (FS) as a result of the emulsion polymerization process. Nevertheless, embodiments wherein at least a fraction of surfactant (FS) is added during manufacture of the composition separately are also to be considered.

The fluorinated surfactant (FS) typically complies with formula (III) here below:

$$R_{f\!S}(X^-)_k(M^+)_k \qquad (III)$$

wherein:
  $R_{f\!S}$ is selected from a $C_5$-$C_{16}$ (per)fluoroalkyl chain, optionally comprising one or more catenary or non-catenary oxygen atoms, and a (per)fluoropolyoxyalkyl chain,
  $X^-$ is selected from —$COO^-$, —$PO_3^-$ and —$SO_3^-$,
  $M^+$ is selected from $NH_4^+$ and an alkaline metal ion, and
  k is 1 or 2.

Non-limitative examples of fluorinated surfactants (FS) suitable for the aqueous emulsion polymerization process of the invention include, notably, the followings:
  (a) $CF_3(CF_2)_{n0}COOM'$, wherein $n_0$ is an integer ranging from 4 to 10, preferably from 5 to 7, preferably $n_1$ being equal to 6, and M' represents $NH_4$, Na, Li or K, preferably $NH_4$;
  (b) T-$(C_3F_6O)_{n1}(CFXO)_{m1}CF_2COOM''$, wherein T represents a Cl atom or a perfluoroalkoxyde group of formula $C_xF_{2x+1-x'}Cl_{x'}O$, wherein x is an integer ranging from 1 to 3 and x' is 0 or 1, $n_1$ is an integer ranging from 1 to 6, $m_1$ is an integer ranging from 0 to 6, M" represents $NH_4$, Na, Li or K and X represents F or —$CF_3$;

(c) F—$(CF_2CF_2)_{n2}$—$CH_2$—$CH_2$—$RO_3M'''$, in which R is a phosphorus or a sulphur atom, preferably R being a sulphur atom, M''' represents $NH_4$, Na, Li or K and $n_2$ is an integer ranging from 2 to 5, preferably $n_2$ being equal to 3;

(d) $[R_f—O-L-COO^-]_i X^{i+}$, wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, $X^{i+}$ represents a cation having the valence i and i is 1, 2 or 3;

(e) A-$R_{bf}$-B bifunctional fluorinated surfactants, wherein A and B, equal to or different from each other, have formula —$(O)_p$CFX"—COOM*, wherein M* represents $NH_4$, Na, Li or K, preferably M* representing $NH_4$, X" is F or —$CF_3$ and p is an integer equal to 0 or 1, and $R_{bf}$ is a divalent (per)fluoroalkyl or (per)fluoropolyether chain such that the number average molecular weight of A-$R_{bf}$-B is in the range of from 300 to 1800; and (f) mixtures thereof.

Non-limitative examples of suitable hydrogenated surfactants (H) include, notably, ionic and non-ionic hydrogenated surfactants such as 3-allyloxy-2-hydroxy-1-propane sulfonic acid salts, polyvinylphosphonic acid, polyacrylic acids, polyvinyl sulfonic acid, and salts thereof, octylphenol ethoxylates, polyethylene glycol and/or polypropylene glycol and the block copolymers thereof, alkyl phosphonates and siloxane-based surfactants.

Surfactants (H), if used, are generally added during manufacture of the composition separately from the polymer (F).

Hydrogenated surfactants (H) which may be preferably added to the aqueous latex are non-ionic surfactants commercially available as TRITON® X series and PLURONIC® series.

The surfactant, when used, is generally present in an amount of 10 to 0.01% wt, preferably from 0.05 to 5% wt, more preferably from 0.1 to 3% wt, with respect to the total weight of the composition.

As said, the electrode forming composition of the invention comprise particles of at least one powdery active electrode material [particles (P)], said particles (P) comprising a core of an active electrode compound [compound (E)].

For the purpose of the present invention, by "active electrode compound" [compound (E)] it is intended to denote an electroactive particulate material which actively participate in the underlying redox reaction during charge/discharge phenomena of a secondary battery.

It is thus understood that the compound (E) is different from the metallic compound [compound (M)] of the outer layer, which is substantially inert in the redox reaction.

The nature of the compound (E) will depend on whether the aqueous composition of the invention will be used to form a positive (cathode) or a negative (anode) electrode. The active electrode compound can thus selected from active cathode compounds, herein below referred to as compounds (E+), and active anode compounds, herein below referred to as compounds (E−).

As the invention is particularly advantageous for providing composition suitable for the manufacture of positive electrodes, the compound (E) is generally an active cathode compound [compound (E+)].

The compound (E+) may be selected from the group consisting of:

composite metal chalcogenide represented by a general formula of $LiMY_2$, wherein M denotes one or more than one transition metal, including Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiMnO_2$ $LiNi_xCo_{1-x}O_2$ (0<x<1), $Li_xCo_{1-y}Al_yO_2$ (0<x<1, 0<y<1) and spinel-structured $LiMn_2O_4$; nevertheless a broader range of chalcogenide might be considered, including those represented by formulae:

  (1)

  (2)

  (3)

  (4)

  (5)

  (6)

  (7)

  (8)

  (9)

  (10)

  (11)

wherein:
0.95≤x≤1.1, 0≤y≤0.5, 0≤z≤0.5, 0≤a≤2;
M is Ni or Co, M' is one or more elements selected from a group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, M" is one or more elements selected from a group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, A is selected from the group consisting of O, F, S and P, and Z is selected from the group consisting of F, S, and P;

a lithiated or partially lithiated transition metal oxyanion-based electrode materials of the nominal formula $AB(XO_4)_fE_{1-f}$ in which A is lithium, which may be partially substituted by another alkali metal representing less that 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1. The above $AB(XO_4)_fE_{1-f}$ electrode materials are preferably phosphate-based and may have an ordered or modified olivine structure. More preferably, the powdery electrode material as described above complies with formula $Li_{3-x}M'_yM''_{2-y}(XO_4)_3$ in which: 0≤x≤3, 0≤y≤2; M' and M" are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the active material is a phosphate-based electrode material having the nominal formula Li(Fe$_x$Mn$_{1-x}$)PO$_4$ in which 0≤x≤1, wherein x is preferably 1 (that is to say, Lithium Iron Phosphate of formula: LiFePO$_4$).

Preferred compounds (E+) are selected from the group consisting of: LiCoO$_2$, LiNiO$_2$, LiMnO$_2$ LiNi$_x$Co$_{1-x}$O$_2$ (0<x<1), Li$_x$Co$_{1-y}$Al$_y$O$_2$ (0<x<1, 0<y<1), LiMn$_2$O$_4$, LiFePO$_4$ and Li(Fe$_x$Mn$_{1-x}$)PO$_4$ (0<x<1).

A compound (E+) which has been found particularly advantageous is LiCoO$_2$.

Nevertheless, the invention also encompasses composition suitable for forming a negative electrode for a lithium ion battery; according to these embodiments, the compound (E−) may preferably comprise:
- graphitic carbons able to intercalate lithium, typically existing in forms such as powders, flakes, fibers or spheres (for example, mesocarbon microbeads) hosting lithium;
- lithium metal;
- lithium alloy compositions, including notably those described in U.S. Pat. No. 6,203,944 (3M INNOVATIVE PROPERTIES CO.) 20 Mar. 2001 and/or in WO 00/03444 (MINNESOTA MINING AND MANUFACTURING CO.) 10 Jun. 2005;
- lithium titanates, generally represented by formula Li$_4$Ti$_5$O$_{12}$; these compounds are generally considered as "zero-strain" insertion materials, having low level of physical expansion upon taking up the mobile ions, i.e. Li$^+$;
- lithium-silicon alloys, generally known as lithium silicides with high Li/Si ratios, in particular lithium silicides of formula Li$_{4.4}$Si;
- lithium-germanium alloys, including crystalline phases of formula Li$_{4.4}$Ge.

Further, the particles of at least one powdery active electrode material [particles (P)] comprise an outer layer of a metallic compound [compound (M)] different from Lithium, said outer layer at least partially surrounding the core of compound (E), as above detailed.

In said particles (P) the outer layer of compound (M) preferably completely surrounds (e.g., encapsulating) the core. Still, it is possible for particles (P) to comprise an outer layer not completely surrounding the core, but only partially covering the core, leaving a portion of the core exposed. These particles will typically be present in relatively small amounts, typically less than 10% compared to particles where the outer layer does completely surround or encapsulate the core.

The expression 'metallic compound different from Lithium' is intended to encompass both a single metal different from Lithium in its elemental oxidation state but also intermetallic compounds comprising more than one metals in their elemental oxidation state (including metal alloys), wherein at least one of said metal is different from Lithium.

While the choice of the metallic compound [compound (M)] of the outer layer is not particularly critical, compounds (M) will be selected in order to ensure inertness in the redox reaction and in the aqueous medium.

The compound (M) can comprise at least one of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, Ga. The compound (M) is advantageously one of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, and Ga or is an alloy of one or more of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, and Ga. Preferably, the compound (M) comprises at least one of Al, Cu, Ag, Ni and even preferably is one of Al, Cu, Ag, Ni or an alloy of one or more of Al, Cu, Ag, and Ni. More preferably the compound (M) is Cu, Ag or an alloy of Ag and/or of Cu, even more preferably the compound (M) is Cu.

Particles of compound (E) as above detailed can be modified on their surface with compound (M) for providing particles (P), as above detailed, comprising a core of compound (E) and an outer layer of a metallic compound (M), said outer layer at least partially surrounding said core, according to standard methods.

Among said methods mention can be made of 'dry' processes, not involving contact of compound (E) with a liquid phase, including notably evaporation techniques such as chemical vapour deposition, thermal evaporation, ion beam evaporation, filament evaporation, vacuum deposition, and sputtering techniques.

As an alternative, methods suitable can involve the contact of compound (E) with a liquid phase, including coating, impregnation or dipping techniques.

Among those techniques, electroplating and electroless plating techniques are particularly suitable for preparing particles (P) as above detailed, with electroless plating techniques being preferred.

In electroplating, an ionic precursor of compound (M) is supplied with electrons to form a non-ionic coating. A common system involves an electrolytic cell comprising a solution with said ionic precursor of compound (M), an anode which may consist of the metal being plated (a soluble anode) or an insoluble anode (usually carbon, platinum, titanium, lead, or steel), and finally, a cathode (negatively charged) where electrons are supplied to produce a film of non-ionic metal.

Electroless plating, also known as chemical or auto-catalytic plating, is a non-galvanic type of plating method; according to said technique, a soluble precursor of compound (M) is provided in a liquid phase in which the particles of compounds (E) are introduced, in the additional presence of a suitable agent inducing plating of the compound (M) onto said particles.

Generally, ionic salts of the compound (M) comprising the metal in an oxidative state higher than zero are used in combination with appropriated chemical reducing agents suitable for reducing said ionic salts of the compound (M) into compound (M) in its elemental state.

The electroless plating medium can be aqueous or non aqueous; nevertheless, aqueous electroless plating media are typically used.

To the aim of electroless plating an outer layer of Copper, generally, a plating bath comprising sodium hydroxide, formaldehyde, a chelating agent (e.g. EDTA), and a copper salt (generally a Cu$^{+II}$ salt, such as copper (+II) sulphate) are used. Palladium is often used as catalyst and can be preliminarily impregnated onto the particles of compound (E). Without being bound by this theory, it is generally understood that in the complex reaction, possibly catalyzed by palladium, formaldehyde reduces the copper ion to metallic copper.

The electrode-forming composition of the invention generally comprises the particles (P) in an amount of from 80 to 98% wt, preferably from 85 to 97% wt, more preferably from 87 to 96% wt, with respect to the total weight of the composition.

Particularly good results were obtained with electrode-forming compositions comprising about 95% wt of the particles (P).

The electrode-forming composition of the invention can notably additionally comprise at least one electroconductivity-imparting additive. Said additive is generally added in an amount of 0.5 to 15% wt, preferably 0.75 to 12.5% wt, more preferably of 1 to 10% wt, with respect to the total weight of the composition, advantageously aiming at improving the conductivity of the electrode.

Non-limitative examples of suitable electroconductivity-imparting additives include, notably, carbon black, graphene or carbon nanotubes and powders and fibers of metals, such as nickel and aluminum.

Further, the electrode-forming composition of the invention can contain at least one thickener; when present, the amount of thickener (also designated as rheology modifier) is not particularly limited and generally ranges between 0.1 and 10% wt, preferably between 0.5 and 5% wt, with respect to the total weight of the composition. The thickener is generally added in order to prevent or slow down the settling of the powdery electrode material from the aqueous composition of the invention, while providing appropriate viscosity of the composition for a casting process. Non-limitative examples of suitable thickeners include, notably, organic thickeners such as partially neutralized poly(acrylic acid) or poly(methacrylic acid), carboxylated alkyl cellulose like carboxylated methyl cellulose and inorganic thickeners such as natural clays like montmorillonite and bentonite, manmade clays like laponite and others like silica and talc.

As said, the electrode-forming composition comprises water; the electrode-forming compositions may comprises, in addition to water, at least one additional liquid solvent, preferably selected from the group consisting of polar organic solvents. Nevertheless, the electrode-forming composition of the invention generally comprises water in an amount exceeding the amount of any possible additional solvent. Generally, water represents at least 50% wt, preferably at least 75% wt, more preferably at least 80% wt, with respect to the total weight of water and additional liquid solvent.

Said polar organic solvent is generally selected from the group consisting of N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate. These organic solvents may be used singly or in mixture of two or more species.

Nevertheless, preferred embodiments are those wherein the electrode-forming composition is substantially free from said additional liquid solvent different from water.

The invention further pertains to a process for manufacturing the electrode-forming composition of the invention.

The process advantageously comprises mixing the polymer (F) and the particles (P), as above detailed in an aqueous medium, preferably in water.

In the process of the invention, the polymer (F) can be provided under the form of dry powder or can be provided under the form of an aqueous dispersion. Said aqueous dispersion can be a latex of polymer (F) as directly obtained from aqueous emulsion polymerization or can be a dispersion obtained by dispersing in an aqueous medium particles of polymer (F).

Mixing of the polymer (F), particles (P) and all other above mentioned optional ingredients of the electrode-forming composition as above detailed may be performed by an apparatus such as, for example, a roll kneader, a mixer, a homo mixer, a ball mixer, a bead mill.

Still another object of the invention is a process for manufacturing an electrode structure using the aqueous electrode-forming composition as above detailed.

Said process advantageously comprises applying the electrode-forming composition as above detailed onto at least one surface of a substrate, preferably of a metal substrate.

The electrode-forming composition may be applied by any conventional wet coating process. Particularly, as non-limiting examples, the wet coating process may include screen printing, coating using a roll coater, a blade coater, a slit coater, a curtain coater, a wire coater, a sprayer, a foam applicator, a brush coater and the like.

The drying process for the coated bus electrode forming composition to form the photosensitive conductive layer may be selected depending upon the solvent used in the composition. As a non-limiting example, the drying may be performed at a temperature ranging from 50 to 150° C. As specific, non-limiting embodiments, the drying temperature may range from 50 to 100° C. or from 100 to 150° C.

Figure 2:
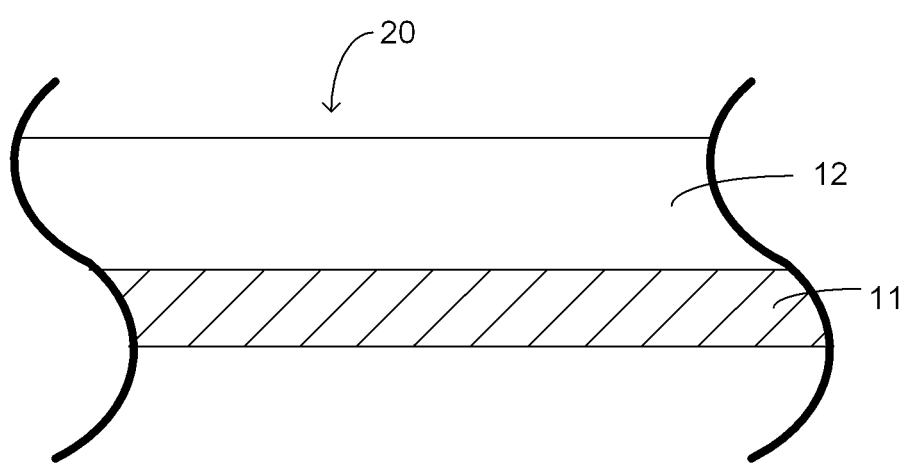
FIG. 2 shows an electrode structure obtained by applying the electrode-forming composition on the invention on one surface of an electroconductive substrate.

The electrode-forming composition may be used for forming electrode structures having different partial sectional structures as shown in FIG. 1 and FIG. 2. More specifically, the electrode-forming composition may be applied onto both surfaces (FIG. 1) or one surface (FIG. 2) of an electroconductive substrate 11 comprising a foil or wire net of a metal, such as iron, stainless steel, steel, copper, aluminum, nickel or titanium and having a thickness of, e.g., 5-100 µm, or 5-20 µm for a small-sized device, and dried to form a composite electrode layer (12a, 12b or 12) of, e.g., 10-1000 µm in thickness for a small-sized device, thereby providing an electrode structure (10 or 20).

Alternatively, it is also possible to form an electrode structure similar to the one shown in FIG. 1 or FIG. 2 by once forming a composite electrode layer 12 as shown in FIG. 2 on an electroconductive substrate 11 or an arbitrary substrate having a better releasability by application and drying, then peeling only the composite electrode layer 12 apart from the substrate to obtain an electrode sheet, and then applying the electrode sheet onto an electroconductive substrate 11 with an electroconductive adhesive by a manufacturer of an electrochemical device, such as a battery.

Figure 3:
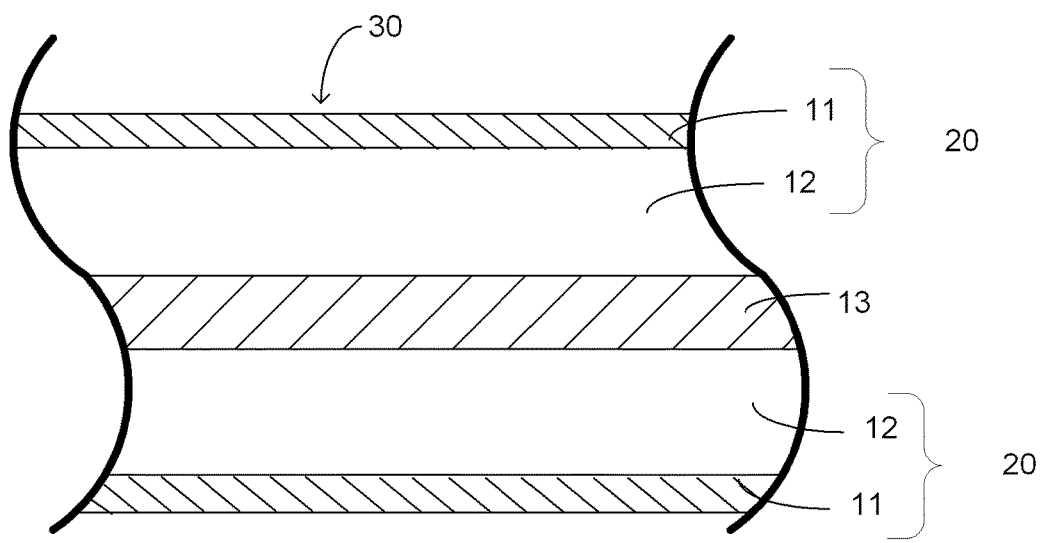
FIG. 3 is a laminate structure obtained assembling a pair of electrode structures with a separator, which may constitute a battery or an electric double layer capacitor.

The thus-formed electrode structure 10 or 20 may preferably be used as an electrode for a battery or an electric double layer capacitor wherein it is used in the state of being dipped in a non-aqueous electrolytic solution. For example, a laminate structure as shown in FIG. 3 may be formed by disposing a pair of electrode structures 20 shown in FIG. 2 so that their composite electrode layers 12 are disposed on inner sides and opposite to each other, disposing a liquid permeable separator 13 so as to be sandwiched between the composite electrode layers 12, and impregnating the composite electrode layers 12 and the separator 13 with a non-aqueous electrolytic solution. Such a laminate structure as shown in FIG. 3 may constitute a battery or an electric double layer capacitor.

The electrode structure made from the electrode-composition as above detailed is still another object of the present invention.

Further, the electrode structure according to the present invention, preferably in the form of an electrodes structure 10 (FIG. 1) having composite electrode layers 12a and 12b on both sides, may be used as a positive electrode or a negative electrode of a non-aqueous battery, particularly a lithium ion battery.

More generally, the electrode structure as above detailed can be used in any electrochemical devices. The use of the electrode structure, as above detailed, in electrochemical devices, including notably non-aqueous batteries, e.g. lithium ion batteries, and capacitors, in particular electric double layer capacitor, is another object of the present invention.

Should the disclosure of any patents, patent applications, and publications which are incorporated herein by reference conflict with the description of the present application to the extent that it may render a term unclear, the present description shall take precedence.

The invention will be now described in more details with respect to the following examples, whose purpose is merely illustrative and not intended to limit the scope of the invention.

Raw Material $LiCoO_2$: commercial grade supplied by Umicore Korea Ltd.

PREPARATIVE EXAMPLE 1

Manufacture of Aqueous VDF-AA Polymer Latex

In a 21 lt. horizontal reactor autoclave equipped with baffles and stirrer working at 40 rpm, 14 lt. of deionised water were introduced, followed by 0.1 g of a 20% by weight aqueous solution of FLUOROLINK® 7800 SW sodium salt fluorinated surfactant. The pressure of 35 bar was maintained constant throughout the whole trial by feeding VDF gaseous monomer. Then the temperature was brought to 85° C. and 400 ml of a 37.5 g/l aqueous solution of ammonium persulfate (APS) were added over a period of 20 minutes. For the whole duration of the trial, 20 ml of a solution of acrylic acid (AA) (2.3% w/w acrylic acid in water) were fed every 250 g of polymer synthesized.

When 5000 g of the mixture were fed, the feeding mixture was interrupted, then the pressure was let to fall down up to 11 bar while keeping the reaction temperature constant. Final reaction time was 150 min.

The reactor was cooled to room temperature, the latex was unloaded and 1000 g of a 10% by weight aqueous solution of PLURONIC® F108 hydrogenated surfactant were added upon stirring.

The VDF-AA polymer so obtained contained 0.15% by moles of acrylic acid (AA) monomer.

The aqueous latex so obtained had a solid content of 26% by weight. The VDF-AA polymer is dispersed in the aqueous latex under the form of particles having an average primary size of 340 nm, as measured according to ISO 13321.

PREPARATIVE EXAMPLE 2

Metallization Process

Particles of $LiCoO_2$ powders were coated with metallic copper by electroless plating. Prior to the copper deposition, the $LiCoO_2$ powder was catalyzed by the wet process of Pd activation. This activation process was carried out by the immersion of the powder in an aqueous solution containing 0.03 g/L of $PdCl_2$ for 1 min, resulting in the substrate being entirely covered with Pd particles at a high density.

The $LiCoO_2$ powder was immersed under magnetic stirring (200 rpm) in the aqueous plating bath which contained 6 g/L copper sulfate, 27 g/L EDTA, 7.47 mL/L formaldehyde and 5.6 g/L sodium hydroxide. The plating temperature and pH value of the plating solution were 60° and 12, respectively. After the deposition, the Cu coated $LiCoO_2$ powder was dried in an oven at 100° C. for 2 h.

EXAMPLE 3

Manufacture of a Cathode using Cu-coated LiCoO2 Particles

An aqueous composition was prepared by mixing 4.15 g of PVDF polymer latex and 0.12 g of carboxylated methyl cellulose as thickener, 12.9 g of deionised water, 1.2 g of SuperP (conductive Carbon Black) and 21.6 g of Lithium Cobaltum Oxide ($LiCoO_2$) coated with copper (example 1). The mixture was homogenised by moderate stirring using a Dispermat equipped with a flat PTFE disc.

A positive electrode was obtained casting the aqueous composition so obtained on an aluminum foil with a doctor blade and drying the coating layer so obtained in an oven with three temperature steps at 60° C. for 30 min, then at 100° C. for 30 min and finally at 200° C. for 30 min to improve the electrode adhesion. The thickness of the dried coating layer was about 50-60 μm. The positive electrode so obtained was composed by 4.5% by weight of the PVDF polymer binder, 90% by weight of the active material, 5% by weight of conductive additive and 0.5% by weight of the thickener.

COMPARATIVE EXAMPLE 4

Manufacture of a Cathode using Uncoated $LiCoO_2$ Particles

A cathode was prepared following same procedure as detailed above in Example 3, but using uncoated $LiCoO_2$ particles.

COMPARATIVE EXAMPLE 5

Manufacture of a Cathode using Uncoated $LiCoO_2$ Particles and Non-aqueous Binder (PVDF-NMP)

A PVDF solution at 8% wt concentration was obtained mixing 4 grams of PVDF powder and 46 grams of NMP with a magnetic stirrer, until complete polymer dissolution. A slurry was obtained mixing 12.50 grams of the previous solutions with 18.50 grams of NMP, 1 gram of SuperP (conductive Carbon Black) and 18 g of bare Lithium Cobaltum Oxide ($LiCoO_2$). The mixture was homogenised by moderate stirring using a Dispermat equipped with a flat PTFE disc. All the materials involved in the slurry preparation were previously conditioned either by drying using molecular sieve of 4 Å (for the solvent) or by heating for one night at 100° C. (for the powders). A positive electrode was obtained casting the aqueous composition so obtained on an aluminum foil with a doctor blade and drying the so obtained coating layer in an oven at 130° C. for 30 min under vacuum. The thickness of the dried coating layer was about 50-60 μm. The positive electrode so obtained was composed by 5% by weight of the PVDF polymer binder, 90% by weight of the active material and 5% by weight of conductive additive.

Evaluation of Electrochemical Properties of Manufactured Cathodes

Lithium coin cells (CR2032 type) were prepared in a glove box under Ar gas atmosphere by punching a small disk of the electrode prepared according to Example 3 and Comparative Example 4 and 5 with Lithium metal as counter and reference electrode. The electrolyte was 1 M $LiPF_6$ in ethylene carbonate (EC)/dimethylcarbonate (DMC) (1:1 vol/vol) and a Whatman® glass-fiber paper was used as separator.

After initial charge and discharge cycles at low current rate, cells were galvanostatically cycled at constant current rate of 0.33 C to show capacity fade over cycling (see Table 1 here below). The electrochemical results confirm that the Cu coating can greatly increase the stability of $LiCoO_2$ in the presence of water based binder, thus enabling a capacity retention strongly improved over electrodes made from uncoated $LiCoO_2$ powders, and substantially similar, even better, over results obtained from traditional solvent-borne electrode-forming compositions.

TABLE 1

| Cathode | Initial RC (mAh/g) | RC after 50 cycles (mAh/g) | Capacity retention (%) |
| --- | --- | --- | --- |
| Ex. 3 | 126 | 112.5 | 89.3% |
| Ex. 4C | 130.6 | 30 | 23% |
| Ex. 5C | 141.3 | 116.5 | 82.4% |

RC: Reversible Capacity;
Capacity retention determined after 50 cycles.

The invention claimed is:
1. An aqueous electrode-forming composition comprising:
at least one polymer (F), wherein polymer (F) is a fluoropolymer;
particles of at least one powdery active electrode material (P), said particles (P) comprising a core of an active electrode compound (E) and an outer layer of a metallic compound (M) different from Lithium, said outer layer surrounding said core,
wherein compound (M) is one of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, and Ga or is an alloy of one or more of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, and Ga,
wherein compound (E) is different from compound (M) and is an active cathode compound (E+) selected from the group consisting of composite metal chalcogenides represented by a general formula of $LiMY_2$, wherein M denotes at least one transition metal, selected from Co, Ni, Fe, Mn, Cr and V; and Y denotes a chalcogen, selected from O and S; and water.
2. The aqueous electrode-forming composition of claim 1, wherein polymer (F) is a vinylidene fluoride (VDF) polymer comprising:
(a') at least 50% by moles of recurring units derived from vinylidene fluoride (VDF);
(b') optionally from 0.1 to 20% by moles of a fluorinated monomer different from VDF; and
(c') optionally from 0.1 to 10%, by moles, based on the total amount of monomers (a') and (b'), of one or more hydrogenated monomer(s).
3. The aqueous electrode-forming composition of claim 2, wherein polymer (F) is a VDF polymer comprising recurring units derived from vinylidene fluoride (VDF) and from at least one (meth)acrylic monomer (MA) having formula (I):

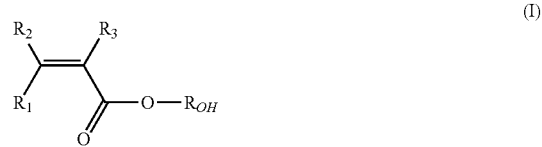

wherein:
$R_1$, $R_2$ and $R_3$, equal to or different from each other, are independently selected from a hydrogen atom and a $C_1$-$C_3$ hydrocarbon group, and
$R_{OH}$ is a hydrogen atom or a $C_1$-$C_5$ hydrocarbon moiety comprising at least one hydroxyl group.
4. The aqueous electrode-forming composition of claim 1, wherein compound (E+) is selected from the group consisting of $LiCoO_2$, $LiNiO_2$, $LiMnO_2$, $LiNi_xCo_{1-x}O_2$ (wherein 0<x<1), and $Li_xCo_{1-y}Al_yO_2$ (wherein 0<x<1 and 0<y<1).
5. The aqueous electrode-forming composition of claim 1, wherein the compound (M) comprises at least one of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, or Ga.
6. The aqueous electrode-forming composition of claim 5, wherein the compound (M) is Cu, Ag or an alloy of Ag and/or of Cu.
7. The aqueous electrode-forming composition of claim 1, said composition additionally comprising at least one electroconductivity-imparting additive.
8. The aqueous electrode-forming composition of claim 1, said composition being substantially free from additional liquid solvent different from water.
9. A process for manufacturing the electrode-forming composition of claim 1, said process comprising mixing polymer (F) and particles (P), and optionally other ingredients, in an aqueous medium.
10. The process of claim 9, wherein mixing of polymer (F), particles (P) and all optional ingredients is performed by an apparatus selected from a roll kneader, a mixer, a homo mixer, a ball mixer, a bead mill.
11. A process for manufacturing an electrode structure, said process comprising applying the electrode-forming composition of claim 1 onto at least one surface of a substrate.
12. The process of claim 11, wherein the electrode-forming composition is applied by a wet coating process selected from screen printing, coating using a roll coater, a blade coater, a slit coater, a curtain coater, a wire coater, a sprayer, a foam applicator, and a brush coater.
13. An electrode structure made from the electrode-composition of claim 1.
14. An electrochemical device comprising an electrode structure according to claim 13.
15. The aqueous electrode-forming composition of claim 2, wherein polymer (F) is a vinylidene fluoride (VDF) polymer comprising:
(a') at least 80% by moles of recurring units derived from vinylidene fluoride (VDF);
(b') optionally from 0.1 to 10% by moles of a fluorinated monomer different from VDF; and
(c') optionally from 0.1 to 3% by moles, based on the total amount of monomers (a') and (b'), of one or more hydrogenated monomer(s).
16. The aqueous electrode-forming composition of claim 15, wherein the fluorinated monomer different from VDF is selected from vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures thereof.

17. The aqueous electrode-forming composition of claim 7, wherein the electroconductivity-imparting additive is at least one additive selected from carbon black, graphene or carbon nanotubes, and powders and fibers of metals, including nickel and aluminium.

18. An aqueous electrode-forming composition comprising:
- at least one polymer (F), wherein polymer (F) vinylidene fluoride (VDF) polymer comprising:
  - (a') at least 80% by moles of recurring units derived from vinylidene fluoride (VDF), and
  - (c') from 0.1 to 3% by moles of at least one (meth)acrylic monomer (MA) having formula (I):

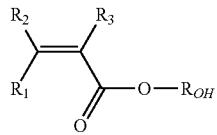
(I)

wherein:

$R_1$, $R_2$ and $R_3$, equal to or different from each other, are independently selected from a hydrogen atom and a C1-C3 hydrocarbon group, and $R_{OH}$ is a hydrogen atom or a C1-C5 hydrocarbon moiety comprising at least one hydroxyl group;

particles of at least one powdery active electrode material (P), said particles (P) comprising a core of an active cathode compound (E+) selected from the group consisting of composite metal chalcogenides represented by general formula $LiMY_2$, wherein M denotes one or more transition metals selected from Co, Ni, Fe, Mn, Cr and V, and Y denotes O or S, and an outer layer of a metallic compound (M) selected from Cu, Ag, an alloy of Ag, an alloy of Cu and mixtures thereof, said outer layer at least partially surrounding said core; and water.

* * * * *